Feb. 8, 1966 C. M. SULLIVAN 3,233,564
INDUSTRIAL PALLET
Filed Oct. 5, 1964 2 Sheets-Sheet 1
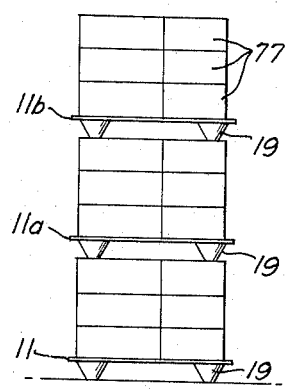
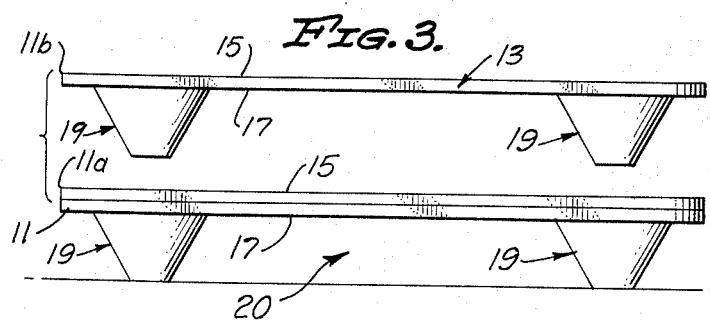
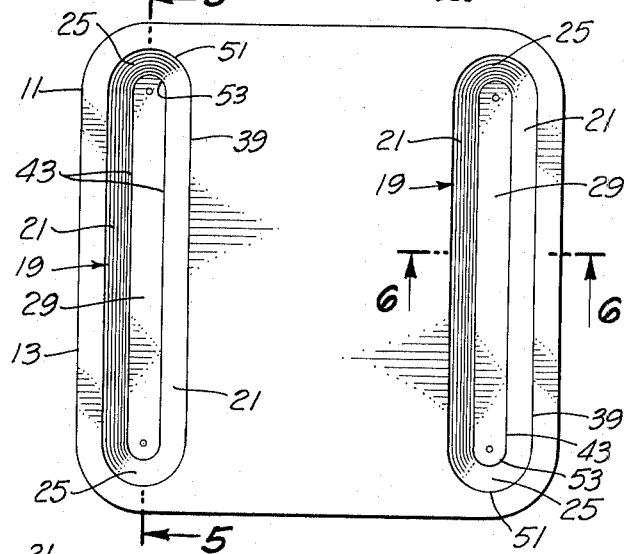
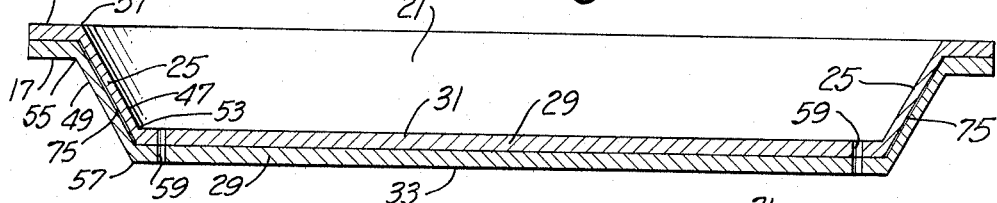
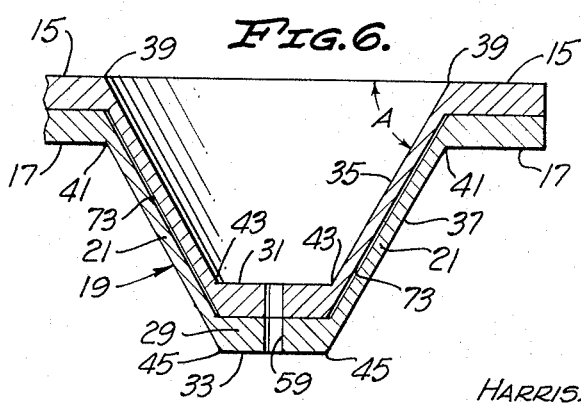
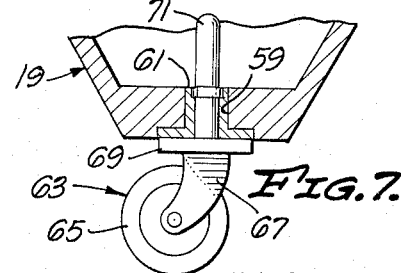
INVENTOR
CHARLES M. SULLIVAN
BY HIS ATTORNEYS
HARRIS, KIECH, RUSSELL & KERN Feb. 8, 1966     C. M. SULLIVAN     3,233,564
INDUSTRIAL PALLET
Filed Oct. 5, 1964     2 Sheets-Sheet 2
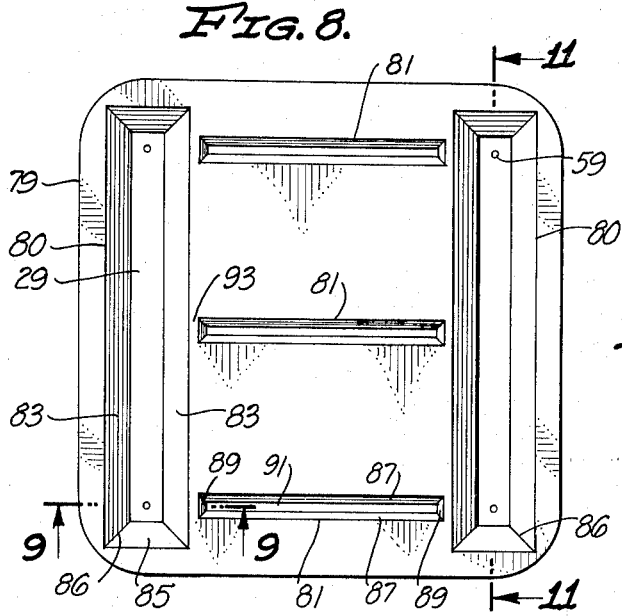
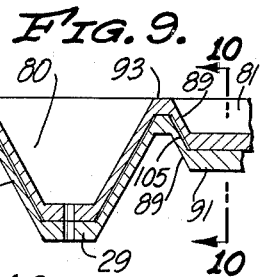
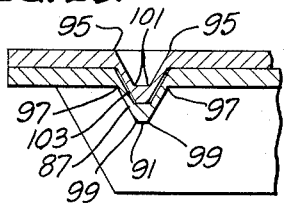
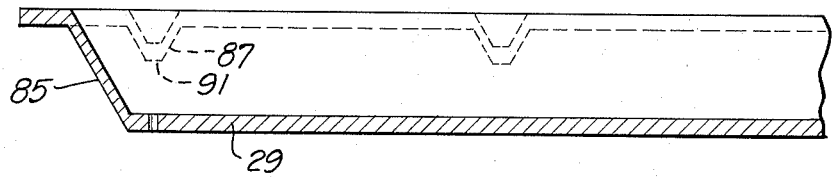
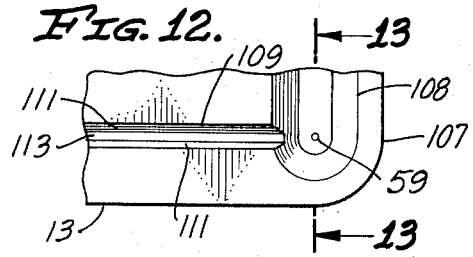
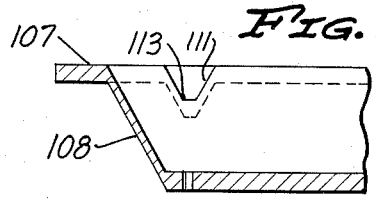
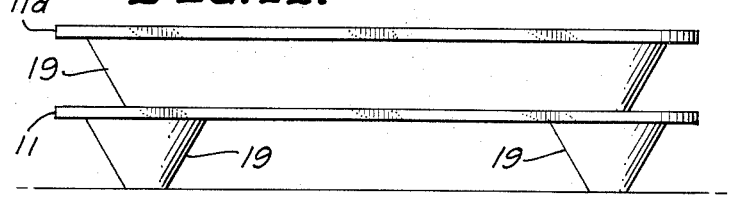
INVENTOR
CHARLES M. SULLIVAN
BY HIS ATTORNEYS
HARRIS, KIECH, RUSSELL & KERN

United States Patent Office 3,233,564
Patented Feb. 8, 1966

3,233,564
INDUSTRIAL PALLET
Charles M. Sullivan, 5649 Aladdin St., Los Angeles, Calif.
Filed Oct. 5, 1964, Ser. No. 401,500
15 Claims. (Cl. 108—53)

This invention relates to pallets used industrially for supporting objects during processing or for storage or shipping the supported objects. The pallet is such that it and any load thereon can be transported from place to place by use of a fork-lift vehicle.

Present pallets of this nature are made of wood, consisting usually of a wood platform or deck with skid-like supports of wood at opposite ends to support the platform above the floor. Such pallets are bulky and cannot be nested. It is expensive to store empty pallets of this type or to ship them back from a remote shipping point. The pallets tend to lose their strength and become waterlogged if exposed to the weather. They tend to absorb liquids spilled thereon and in the food industry cannot be sterilized between uses as is now often required. Some pallets, effective in remedying some of these deficiencies do not possess sufficient strength or rigidity to support heavier loads.

It is an object of this invention to provide a pallet of strong and rigid waterproof plastic material which may be steam-cleaned and is free of exposed fastenings.

It is another object of this invention to provide a plastic pallet which is stackable and nestable with pallets identical therewith.

A further object of this invention is to provide a plastic pallet having laterally elongated hollow legs to provide increased bearing or contact surface with the member supporting the pallet and to increase the strength and rigidity of the pallet. Two such hollow legs are preferably provided, respectively elongated in the direction of and positioned near opposed sides of the pallet to provide therebetween a space to receive the forks of a lift truck.

Still another object of this invention is to provide a plastic pallet with hollow lift ribs in such space adapted to be engaged by such forks. A further object is to provide ribs of a form to increase the strength and rigidity of the pallet and still allow the pallet to be stacked and nested with pallets identical therewith, each rib nesting within the hollow of a corresponding rib of a stacked pallet and each leg nesting within the hollow of a corresponding leg.

Briefly stated, the preferred pallet of the invention is an integrally molded structure of a rigid waterproof plastic material, preferably a material that is also substantially fireproof, the molding being accomplished by any well known molding technique, e.g., by injection molding, pressure molding or vacuum molding techniques. The pallet includes a platform and a plurality of hollow laterally elongated legs depending downwardly therefrom, each leg including at least two long side walls molded integrally with the platform and joined by end walls or bottom walls or both, with all such walls being integrally molded at their junctions. The side walls of the hollow legs converge as they extend downwardly and are somewhat thinner than the thickness of the platform, being designed to be strong and to prevent wedging when a series of the pallets are stacked together. The same is true of the end walls. In one embodiment of the invention, a plurality of hollow lift or reinforcing ribs are molded integrally with the platform. The hollow ribs are so formed and so positioned as to allow stacking and nesting of a series of the pallets without wedging.

The invention also comprises novel details of construction and novel combinations and arrangements of parts which will more fully appear in the course of the following description. The drawings merely show and the description merely describes preferred embodiments of the present invention which are given by way of illustration or example.

In the drawings:

FIG. 1 is a side elevation of a plurality of pallets of the present invention each carrying a load and stacked in a storage or transport position;

FIG. 2 is a plan view of a pallet of the present invention carrying four cartons in a suggested arrangement;

FIG. 3 is a side elevation of a plurality of nested pallets, the uppermost pallet having just been removed from the stack;

FIG. 4 is a plan view of two nested pallets of the present invention;

FIG. 5 is a sectional view taken along the line 5—5 of FIG. 4 showing the manner in which the hollow elongated legs nest;

FIG. 6 is a sectional view taken along the line 6—6 of FIG. 4 showing two nested hollow legs;

FIG. 7 is a fragmentary sectional view showing a castor-type support member that can be used to support a pallet of the invention;

FIG. 8 is a plan view of a modified embodiment of the pallet having a plurality of integrally molded lift or reinforcing ribs thereon;

FIG. 9 is a fragmentary sectional view taken along line 9—9 of FIG. 8 showing the leg-to-leg and rib-to-rib nesting of two pallets;

FIG. 10 is a sectional view taken along the line 10—10 of FIG. 9, showing the rib-to-rib nesting of such two pallets;

FIG. 11 is a fragmentary sectional view taken along line 11—11 of FIG. 8.

FIG. 12 is a fragmentary plan view showing an alternate arrangement of the rib structure in which the rib is extended to intersect the hollow leg;

FIG. 13 is a sectional view taken along line 13—13 of FIG. 12; and

FIG. 14 is a side elevation showing an alternate manner of stacking two pallets to give added rigidity in supporting extremely heavy loads.

The pallets of the invention are polygonal structures, rectangular or square shapes being preferred. FIG. 4 illustrates a single pallet 11 of a shape to be stackable and nestable with superposed identical pallets 11a, 11b, etc. as suggested in FIG. 3.

Each pallet is molded of a hard, rigid, waterproof, and preferably substantially fireproof plastic material, typically a thermosetting resin used with or without a filler, such as wood flour, or other internal reinforcement such as screen, glass fabric, glass filaments, etc. However, many other plastic formulations and internal reinforcements are known to plastics engineers and will be useful in forming the rigid pallets of the invention. The plastic is preferably such as to maintain its shape and strength at temperatures between —50° F. and 250° F. so that the pallets retain their shape and strength when subjected to sub-zero temperatures or to temperatures encountered in steam-cleaning thereof.

Each pallet has a platform 13 having a top support surface 15 and a bottom support or lift surface 17. The top surface 15 is usually a smooth molded surface but may be roughened to prevent slipping of objects thereon. The bottom surface 17 may similarly be a smooth molded surface or may be molded to be relieved in various portions to reduce weight and cost while still remaining sufficiently rigid to support heavy loads.

A plurality of the laterally elongated hollow legs 19 made of such plastic material are joined with the platform 13, preferably by being molded integrally therewith. Two or more of these elongated hollow legs are provided for each pallet to support the platform 13 above the floor or other support surface. The legs are preferably spaced from each other and disposed generally parallel to each other to provide a lift space 20 for receipt of the forks of a fork-lift vehicle not shown. If only two legs are employed they are preferably disposed a distance inwardly of the side edges of the pallet, as shown, to provide auxiliary lift spaces outwardly of the legs to receive forks of a lift truck that are more widely spaced. If more than two legs are employed at least one of the additional legs will desirably be disposed in the lift space 20 parallel to the legs shown and will be straddled by the forks of the lift truck.

Each hollow leg 19 has a peripheral wall including a pair of opposed side walls 21 molded integrally with the platform and extending downwardly therefrom. The side walls 21 converge as they extend downwardly to provide for easy nesting with an identical pallet. As shown, each leg 19 also has a pair of end walls 25 which are preferably molded integrally with the platform and with the side walls 21. Like the side walls 21, the end walls 25 depend downwardly from the platform 13 and converge. Integrally molded with the side walls and end walls is a bottom wall 29 which provides a top support surface 31 and a bottom support surface 33. The bottom wall 29 closes the elongated hollow leg 19 at its bottom. Each leg 19, however, is open at its top in order that it can receive a corresponding hollow leg 19 of another pallet in nesting relationship. In some instances the end walls 25 may be omitted in which event the interior of each leg 19 may be open at its ends with each side wall being of substantially trapezoidal shape.

As each of the elongated hollow legs 19 preferably extends almost the full length of the pallet, each of the side walls 21 is generally substantially elongated and extends well over half the length of the pallet. Each side wall 21 is generally substantially longer than each of the end walls 25. The side walls 21 are generally flat, planar elements and are of lesser thickness than the platform 13. They can be considered as rectangular if each end wall 25 is one half of a frustrum of a cone as shown in FIGS. 3—5. Usually the thickness of each side wall 21 is about one half of the thickness of the platform 13.

Each side wall 21 has an internal surface 35 and an external surface 37. In each leg, each internal surface 35 intersects the top support surface 15 to form a top edge 39. Each external surface 37 intersects the bottom surface 17 to form an external bottle edge 41 which is spaced slightly inwardly from the edge 39. Accordingly, in any one leg, the perpendicular or shortest distance between the edges 39 is slightly greater than the perpendicular distance between the edges 41. Likewise, the internal surface 35 intersects the top surface 31 of the bottom wall 29 to form an internal bottom edge 43 and the external surface 37 intersects the bottom surface 33 to form an external bottom edge 45 which is spaced slightly inwardly from the internal bottom edge 43. Accordingly, in any one leg, the shortest distance between the internal bottom edges 43 is slightly more than the shortest distance between the external bottom edges 45. It should be understood that a small fillet may be formed at each of the edges 39, 41, 43 and 45.

It is preferred that each side wall 21 meet the plane of the platform 13 to form an included angle A, FIG. 6, in the neighborhood of 60° therewith, the angle preferably deviating from 60° by not more than about 8°. With the angle about 60° the thickness of the side walls 21 will be about one-half the thickness of the platform 13, a desirable relation as concerns nesting and load-bearing strength of the side walls. Also the area of the bottom support surface 33 will be adequate to distribute the load over a substantial portion of the floor or the tops of stacked cartons (FIG. 1.) Importantly also the open tops of the legs will not occupy too much of the top support surface 15 so that reasonably small cartons or items can be supported.

As shown in FIGS. 4 and 5, each of the end walls 25 is in the form of one half of a frustum of a cone. Each end wall 25 has an internal frusto-conical surface 47 blending into the internal surfaces 35 of the side walls and an external frusto-conical surface 49 blending into the external surfaces 37 of the side walls. The internal frusto-conical surface 47 intersects the top support surface 15 to form a semicircular top edge 51 and it intersects the top support surface 31 of the bottom wall 29 to form an internal semicircular bottom edge 53. Similarly, the external frusto-conical surface 49 respectively intersects the bottom surface 17 of the platform and the bottom support surface 33 of the bottom wall to form an external semicircular top edge 55 at the top and an external semicircular bottom edge 57 at the bottom. The radius of the semicircular edge 51 is slightly greater than the radius of the semicircular edge 55 and the radius of the semicircular edge 53 is slightly greater than the radius of the semicircular edge 57. If desired, fillets may be formed at the edges 51, 53, 55 and 57. While the end wall 25 are preferably formed as half frustums of cones they can alternatively be made flat, as in FIG. 8, in which event the edges 51, 53, 55 and 57 will usually be straight lines.

As with the side walls 21, each end wall 25 preferably forms with the plane of the platform 13 an included angle of about 60°. The thickness of each end wall 25 will then be substantially equal to the thickness of each side wall 21, e.g., about one-half the thickness of the platform 13.

In each leg, the bottom wall 29 is preferably molded integrally with both side walls 21 and both end walls 25. The bottom wall 29 is usually a long flat strip which connects the side and end walls and may be formed with at least one and preferably two or more apertures 59. The apertures 59 may be used to drain any liquid which might have accumulated in the hollow legs. Optionally, each aperture 59 may be provided with a tubular stainless steel insert 61 as shown in FIG. 7. Various supporting structures may then be inserted into the tubular insert 61. For example, a castor 63 including a wheel 65, a fork 67, a flange 69 and a stem 71 may be provided with the stem 71 removably disposed and journalled in the tubular insert 61 and the flange 69 journalled relative to a flange of the insert 61 by direct engagement or through intervening ball or roller elements. The flanges of such an insert also act as wear plates for the bottoms of the legs 19. Castor-type supports are particularly desirable when a tall stack of empty pallets are to be moved without the aid of a lift truck or when a loaded pallet is to be thus moved a short distance.

Important advantages result from a pallet in which the thickness of the platform 13 measured between the top support surface 15 and the bottom surface 17 is equal to the thickness of the bottom wall 29, measured between its top support surface 31 and its bottom support surface 33. A pallet thus constructed will stack and nest with identical pallets as suggested in FIGS. 5 and 6. In such a stack the top surface 15 of one pallet will be in direct contact with the bottom surface 17 of a superposed pallet, for example, the pallet 11a, FIG. 3. At the same time the bottom walls 29 of the nested legs will be in pressure-transmitting contact with each other. In this respect the top support surface 31 of each bottom wall will be in contact with the bottom support surface 33 of a superposed pallet. The result is that the bottom walls 29 are stacked one upon the other in physical contact to form a column. Any load applied to the top pallet of the stack will be distributed between the peripheral walls of the nested hollow legs 19 of all of the stacked pallets. If the bottom walls 29 were not in physical contact, the entire load would be transferred to and carried by the peripheral walls of the lowermost hollow leg 19. This construction makes it possible to use a single pallet to support lighter loads and to stack two or more pallets together to support heavier loads, all without danger of overstressing the side walls 21 and the end walls 25 of the stacked and nested hollow legs. Likewise taller stacks of nested pallets can be stored or transported without danger that the weight of the upper pallets will overstress the hollow legs of the lowermost pallet.

It will also be noted that neither the side walls 21 nor the end walls 25 of the nested legs wedge one within the other. When nested together, the internal surface 35 of the side wall 21 of any leg is separated minutely from the external surface 37 of the corresponding leg of the superposed pallet to leave a minute side space 73 therebetween, see FIG. 6. Likewise, in the nested position the internal end surface 47 of any leg is separated minutely from the external end surface 49 of the corresponding leg of the superposed pallet to leave a minute end space 75 therebetween, see FIG. 5. These spaces can be very small, being exaggerated in FIGS. 5 and 6 for the purpose of clarity. Each space need be only large enough to prevent wedging of the hollow legs 19 when they are nested as illustrated.

Another important feature of this invention is the elongated bottom wall 29 having a relatively long broad bottom support surface 33. When the pallet is supporting a load and is not being carried by the fork-lift vehicle, the bottom support surface 33 of each leg transmits the entire weight of the load to a supporting surface below. The elongated broad bottom support surface 33 distributes the load and keeps the stress in pounds per square inch on this surface 33 and on any supporting surface relatively low. If a support surface having a lesser area were employed, the stress on such a supporting surface imposed by each leg would be concentrated. The broader surfaces 33 provided by the laterally elongated legs 19 are particularly desirable when stacking several tiers of loaded pallets as in FIG. 1, particularly when loaded with pressboard cartons 77 that must bear the load of superposed pallets. By way of example, several tiers of pallets loaded with cartoned cans of beer or food products can be stored or transported without overstressing or deforming the cartons 77 in the areas contacted by the legs of superposed pallets. Likewise, because the side walls 21 are elongated, they present a relatively large cross-sectional area to resist the force of a load on the platform 13 and can therefore support large loads without failing. Furthermore, each leg 19 is in effect a relatively large reinforcing rib which adds rigidity to the platform 13 and in particular increases the resistance of the platform to bending.

Although two elongated hollow legs 19 are shown in FIG. 4, it should be understood that any number of legs may be provided so long as adequate space is left for the forks of a fork-lift vehicle. The platform and legs may be of any size. Exemplary of one embodiment, the thickness of the platform 13 was one-half inch, the thickness of each side wall and each end wall was about one-fourth inch and the width of the minute side space and the minute end space was about one-sixteenth inch. The distance between the top edges 39 was five and three-eighths inches and the distance between the external bottom edges 45 was about two and one-sixteenth inches. The vertical distance from the plane of the bottom support surfaces 33 to the plane of the bottom lift surface 17 of the platform was about three and one-eighth inches and the included angle between the side walls and the plane of the platform and between the end walls and the plane of the platform was approximately 60°.

FIGS. 8 through 11 show another embodiment of the invention in which hollow lift ribs are employed in a position to be engaged by the forks of the fork lift vehicle. Such ribs can also be positioned to act as reinforcing or rigidifying ribs for the pallet to impart further strength and rigidity thereto. It is a feature of the invention to employ ribs that are hollow and that will nest together when the pallets are stacked. FIG. 8 shows a pallet 79 which is identical to the pallet 11 except that it has a plurality of elongated hollow legs 80 shaped somewhat differently and except that a plurality of hollow lift ribs 81 are provided. Each leg 80 has opposed trapezoidal side walls 83 and opposed trapezoidal end walls 85 that are flat and meet at corners 86, FIG. 8, that may be sharp but which are preferably slightly rounded. Thus each elongated hollow leg shown in FIG. 8 has flat in lieu of curved end walls and forms a frustum of a pyramid. In all other respects, the elongated hollow legs 80 shown in FIG. 8 are identical with the elongated hollow legs 19 shown in FIGS. 1 through 7. The hollow legs 80 have the same nonwedging capability as those hollow legs 19 previously described and their bottom walls 86 engage in columnar relation when the pallets are stacked. It should be understood that the elongated hollow legs 80 with trapezoidal end walls 85 and trapezoidal side walls 83 may be employed in the embodiments illustrated in FIGS. 1 through 7, if desired, also that the end walls of FIGS. 8–11 can be made as half frustums of cones, as in FIGS. 1 through 7, if this is desired.

Each rib 81 is molded integrally with the platform and depends therefrom with its interior flaring toward an opening on the top surface of the platform. Each rib 81 has opposed trapezoidal side walls 87, opposed trapezoidal end walls 89 and a rectangular bottom wall 91. Thus, each rib 81 forms an integrally molded frustum of a pyramid which is considerably more shallow than the hollow legs 80. Like the hollow legs, each of the ribs 81 is open at its top in order that it might receive and nest with corresponding ribs of another pallet. The end walls 89 are optional but desirable if the ends of the hollow ribs are to be closed.

As the hollow legs 80 act as reinforcing elements in one direction it is usually preferred that the longitudinal axes of the legs and at least some of the ribs extend in different directions; also that the ribs 81 be disposed in the lift space to be engaged by the forks of the lift truck. In the form shown in FIGS. 8 through 11, three lift ribs 81 are provided and arranged generally perpendicular to the longitudinal axis of the hollow elongated legs 19. In the embodiment shown in FIGS. 8 through 11, the ribs 81 do not interconnect interiorly with the legs 80 thereby leaving a narrow bridge or neck 93 of the platform 13 between each rib and each leg 19.

The hollow ribs 81 are formed similar to the legs 80 in order to facilitate the stacking and nesting of the pallets without wedging. To this end, each rib 81 is provided with a pair of top edges 95, a pair of upper external side edges 97, a pair of lower external side edges 99 and a pair of lower internal side edges 101, see FIG. 10. In any leg the perpendicular distance between each of the edges 95 is slightly greater than the perpendicular distance between each of the edges 97. Likewise the shortest distance between the edges 101 is slightly greater than the shortest distance between the edges 99. The thickness of the side walls 87 is preferably about half the thickness of the platform 13. Accordingly, when the pallets are nested together, the corresponding side walls 87 of adjacent pallets are minutely separated to form a minute space 103 therebetween. With this construction the side walls 87 of the nested ribs do not wedge one within the other. The end walls 89 are formed in a similar manner so that they do not wedge one within the other when the pallets are nested. In this connection, it will be noted that the end walls 89 are about half as thick as the platform 13 and, when nested, are minutely separated to form another minute space 105, see FIG. 9.

It is preferred that the top and bottom surfaces of the bottom wall 91 should be flat but other configurations can be used. Regardless of such configuration it is desirable that the thickness of the bottom wall 91 of each rib be the same as the thickness of the platform 13. This results in maximizing the strength of each rib against bending and in distributing in a better manner the stresses imposed by the forks of a fork lift vehicle when lifting a loaded pallet. This is particularly important because when the pallet 79 is being carried by a fork-lift vehicle, the entire load on the pallet is applied to those portions of the ribs 81 which engage the forks of the vehicle. As explained in connection with the elongated hollow legs 19, another result of this dimensional relationship is that the bottom walls 91 of pallets stacked one upon the other are in physical contact and form a column. A load applied centrally to the top pallet of the stack tending to bend the pallet will thus be resisted more directly by the ribs of the pallets therebelow. Also when stacked pallets are lifted by the forks the load will be distributed between the several side walls 87 and end walls 89 of the nested hollow ribs 81. If this were not so, the entire load would be transferred to the lowest pallet by the lowermost hollow rib 81. This construction makes it possible to use a single pallet to support heavier loads and to stack two or more pallets together to support even heavier loads, all without danger of overstressing the side walls 87 and end walls 89 of the reinforcing ribs.

Of course, any suitable number of lift ribs 81 may be provided. The ribs 81 may be placed in various patterns on the platform 13 and may, if desired, extend in different directions to provide rigidity in different directions. It is desirable that the bottoms of the bottom walls 91 of the ribs should lie in the same plane so that all ribs are engaged simultaneously by a fork of the lift vehicle. This plane should be near or above the midplane between the tops and bottoms of the legs 80 to give ample space for entry of the forks. A fork space about two-thirds or more the height of each leg is preferred and it is usually preferable to design the pallet with a lift space of a height of at least about 3 inches to provide adequate space for the forks even when a loaded pallet rests on the ground and its legs sink slightly into the earth as a result of the load.

The hollow ribs 81 need not take the shape of a frustum of a pyramid but may be formed with rounded end walls such as end walls 25 of the elongated hollow leg 19 shown in FIGS. 1 through 7. It is also within the scope of this invention to provide small apertures in the bottom 91 of each hollow rib 81 for drainage purposes. It should be understood that the hollow ribs 81 may be employed with the pallet structure shown in FIGS. 1 through 7 and with various other plastic pallet structures whether or not the hollow legs thereof are laterally elongated.

The embodiment shown in FIGS. 11 and 12 is the same as that shown in FIGS. 8 through 11 except that the elongated hollow legs are formed with rounded end walls similar to those shown in FIGS. 4 and 5 and except that the reinforcing ribs are in communication with the interior of the legs. A pallet 107 having a plurality of hollow legs 108 is provided with a plurality of hollow shallow ribs 109. The ribs 109 are identical with the ribs 81 except that the end walls 89 have been removed and the rib has been extended to intersect the inner surfaces of the two elongated hollow legs 108 at the ends of the rib so that the interiors of the legs and the rib are in open communication. Each rib 109 is shown as including a pair of opposed substantially trapezoidal side walls 111 molded integrally with the platform 13, with the side walls of the hollow leg 108, and with a substantially rectangular bottom wall 113 which connects the side walls and which is in turn molded integrally with the side walls of the hollow leg 108. The side walls 111 of the rib 109 are formed to permit nesting but to prevent wedging in the manner similar to that described above in connection with the side walls 87 of the rib 81.

Of course, any number of the ribs 109 may be provided in any desired pattern. The ribs 109 may be used with elongated hollow legs having flat end walls as shown in FIG. 8. Each rib 109 may intersect one or more of the elongated hollow legs 108. Also, a pallet may be provided in which some of the ribs intersect one or more elongated hollow legs 108 and other of the ribs are of the nonintersecting variety shown in FIG. 8.

As indicated above, each of the elongated hollow legs also serves to make the pallets more rigid about an axis transverse to the axis of the legs. FIG. 14 illustrates a manner in which the pallets 11 and 11a of FIG. 3 may be stacked to provide additional multidirectional rigidity. Thus, by placing the pallets as shown in FIG. 13 with the legs of one pallet extending in a direction at right angles to the direction in which the legs of the other pallet extend, additional rigidity in two directions may be provided.

Thus the pallets of the present invention can be stacked in closely nested relationship either to support very large loads or for storage or shipping of empty pallets. The pallets of the present invention are also waterproof, and substantially fireproof and can be easily cleaned and sterilized to meet the exacting conditions in the food industry. It is also apparent that the elonngated hollow leg structure provides added bearing surface to support heavy loads and also adds rigidity to the pallet structure. By utilizing the lift ribs as disclosed herein, additional rigidity can be imparted to the pallet structure and the stresses developed in lifting the loaded pallet or pallets by the forks of a fork-lift vehicle are better distributed.

Various changes and modifications can be made without departing from the spirit of the invention as defined in the appended claims.

What is claimed is:

1. A pallet stackable and nestable with pallets identical therewith, said pallet being molded of a rigid waterproof plastic material, said pallet including:
    a platform molded of said plastic material; and
    a plurality of laterally elongated hollow legs made of said plastic material molded integrally with and depending from said platform with their longitudinal axes parallel and spaced from each other to form at least one lift space therebetween, each of said elongated legs including at least two opposed side walls molded integrally with said platform and extending downwardly therefrom, said side walls converging downwardly, each of said elongated hollow legs having at least two end walls molded integrally with said platform and with said side walls, said end walls converging downwardly from said platform, each of said legs being open at its top to expose the hollow of the leg to the top of the platform, said side and end walls being of a thickness less than the thickness of said platform and shaped to nest in the hollow interior of a corresponding leg of a next-lower pallet of a stack of said pallets with a minute space between the corresponding leg side walls of such pallets and another minute space between the corresponding leg end walls of such pallets.

2. A pallet stackable and nestable with pallets identical therewith, said pallets being molded of a rigid waterproof plastic material, said pallets including:
    a platform molded of said plastic material; and
    a plurality of long and narrow hollow legs made of said plastic material molded integrally with and depending from said platform, each of said elongated legs including at least two elongated opposed side walls molded integrally with said platform and extending downwardly therefrom, said side walls converging downwardly, each of said elongated hollow legs having at least two end walls of less length than said elongated side walls and molded integrally with said platform and with said side walls, said end walls converging downwardly from said platform, each of said legs having a long and narrow bottom wall of said plastic material molded integrally with said side walls and said end walls, each of said legs being open at its top to expose the hollow of the leg to the top of said platform, said side and said end walls being of a thickness less than the thickness of said platform and shaped to nest in the hollow interior of a corresponding leg of a next-lower pallet of a stack of said pallets with a minute space between the corresponding leg side walls of such pallets and another minute space between the corresponding leg and walls of such pallets.

3. A pallet as defined in claim 2 in which the thickness in said bottom wall is equal to the thickness of said platform whereby the platforms of said stacked pallets are in contact with each other and the corresponding bottom walls of the legs of such stacked pallets are in contact with each other to form a column, any load applied to the top pallet of the stack dividing between the side walls of the nested hollow legs.

4. A pallet as defined in claim 2 in which each of the downwardly converging elongated side walls forms an angle in the neighborhood of about 60° with the platform.

5. A pallet as defined in claim 2 in which each of said side walls, each of said end walls, and each of said bottom walls are substantially flat.

6. A pallet as defined in claim 2 in which the bottom wall and the side walls of each of said legs are substantially flat and the ends walls of each leg are shaped substantially as half frustums of a cone at each end of the leg.

7. A pallet as defined in claim 2 in which at least one aperture is formed in the bottom wall of each of said legs.

8. A pallet stackable and nestable with pallets identical therewith, said pallet being molded of a rigid waterproof plastic material, said pallet including:
 a generally rectangular platform molded of said plastic material having side, front and rear edges; and
 a plurality of parallel long and narrow hollow legs made of said plastic material molded integrally with and depending from said platform, said legs being spaced inwardly of and generally parallel to the respective side edges of said platform, each of said elongated legs including at least two elongated opposed planar side walls molded integrally with said platform and extending downwardly therefrom, said side walls converging downwardly, each of said elongated hollow legs having at least two opposed end walls of less length than said elongated side walls and molded integrally with said platform and with said side walls, said end walls converging downwardly from said platform, each of said legs having an elongated bottom wall molded integrally with and connecting said side walls and said end walls, each of said legs being open at its top to expose the hollow of the leg to the top of the platform, said side and end walls being of a thickness less than the thickness of said platform and shaped to nest in the hollow interior of a corresponding leg of a next lower pallet of a stack of said pallets with a minute space between the corresponding leg side walls of such pallet and another minute space between the corresponding leg end walls of such pallets.

9. A pallet stackable and nestable with pallets identical therewith, said pallet being molded of a rigid waterproof plastic material, said pallet including:
 a platform molded of said plastic material; and
 a plurality of laterally elongated hollow legs made of said plastic material molded integrally with and depending from said platform, each of said elongated legs including two elongated opposed side walls molded integrally with said platform and extending downwardly therefrom, said side walls converging downwardly, each of said legs having an elongated bottom wall molded integrally with said side walls, each of said legs being open at its top to expose the hollow of the legs to the top of said platform, said side walls being of a thickness less than the thickness of said platform and shaped to nest in the hollow interior of a corresponding leg of a next-lower pallet of a stack of said pallets with a minute space between the corresponding leg side walls of such pallets.

10. A pallet stackable and nestable with pallets identical therewith, said pallet being molded of a rigid waterproof plastic material, said pallet including:
 a platform molded of said plastic material;
 at least two tall hollow legs of said plastic material molded integrally with said platform depending therefrom with their interiors flaring toward and opening on a top surface of the platform, said tall hollow legs being spaced laterally of each other to provide at least one lift space therebetween,
 each hollow leg having a peripheral wall molded integrally with said platform extending downward therefrom at an angle of about 60° therewith and a bottom wall molded integrally with such peripheral wall of such leg, said peripheral wall being of a thickness less than the thickness of said platform and shaped to nest in the hollow interior of a corresponding leg of a next-lower pallet of a stack of said pallets with a minute space between the peripheral walls of the legs of such pallets,
 the thickness of said bottom wall of each leg being equal to the thickness of said platform whereby the platforms of said stacked pallets are in contact with each other and the corresponding bottom walls of the legs of such stacked pallets are in contact with each other to form a column, any load applied to the top pallet of the stack dividing between the peripheral walls of the legs of the stacked and nested pallets; and
 at least two shallow hollow lift ribs made of said plastic material each molded integrally with said platform depending therefrom with its interior flaring toward and opening on said top surface of said platform, said hollow ribs being disposed in said lift space, each hollow lift rib having a peripheral wall molded integrally with said platform but of a thickness less than the thickness thereof shaped to nest in the hollow interior of a corresponding rib of the next lower pallet of said stack with a minute space between the corresponding peripheral walls of the ribs of such stacked pallets,
 each hollow reinforcing rib also providing a bottom wall molded integrally with the peripheral wall of the rib, the bottoms of the bottom walls of said ribs lying in a plane between said platform and the plane of the bottoms of said bottom walls of said legs, the bottom wall of each rib being of a thickness equal to the bottom walls of said legs whereby such bottom walls of said ribs of said stacked pallets likewise are in contact with each other.

11. A pallet as defined in claim 10 in which the peripheral walls of said ribs comprise an opposed pair of substantially planar longitudinal side walls having internal and external surfaces extending from said platform at an angle of about 60° therewith, the bottoms of said ribs being flat and meeting said outer surfaces of said ribs in relatively sharp edges.

12. A pallet as defined in claim 11 in which each substantially planar longitudinal side wall is substantially trapezoidal in shape.

13. A pallet as defined in claim 10 in which the peripheral wall of each leg provides an inner surface meeting said top surface of said platform at an edge, said peripheral wall of each rib comprising an opposed pair of longitudinal side walls diverging upwardly to said top surface and an opposed pair of end walls having internal surfaces diverging upwardly to said top surface, said internal surfaces of said end walls of each rib meeting said top surface at a position spaced from said edge whereby the hollow interior of each rib is blocked from communication with the hollow interiors of said legs.

14. A pallet as defined in claim 10 in which the peripheral wall of each leg provides an inner surface, and in which the peripheral wall of each lift rib comprises upwardly diverging internal surfaces, at least some of the internal surfaces of said rib extending to and intersecting said inner surface of a corresponding hollow leg to provide communication between the hollow interior of said ribs and said legs.

15. A pallet as defined in claim 10 in which each of said hollow legs is laterally elongated and includes two elongated opposed side walls, said lift ribs traversing said lift space with their ends respectively adjacent said hollow legs at positions spaced lengthwise of said laterally elongated hollow legs.

References Cited by the Examiner
UNITED STATES PATENTS

| | | | |
|---|---|---|---|
| 2,463,214 | 3/1949 | Stoner | 108—52 |
| 2,903,218 | 9/1959 | Altenburg | 108—53 |
| 2,991,965 | 7/1961 | Drieborg | 108—58 |
| 3,140,672 | 7/1964 | De Luca | 108—58 |
| 3,141,422 | 7/1964 | Woolworth | 108—56 |

FOREIGN PATENTS 828,506    2/1960    Great Britain.

FRANK B. SHERRY, *Primary Examiner.*